United States Patent [19]
Whiting

[11] Patent Number: 5,201,897
[45] Date of Patent: Apr. 13, 1993

[54] SPRING BALANCER FOR A ROLL-UP DOOR

[75] Inventor: Lauren C. Whiting, Corfu, N.Y.

[73] Assignee: Whitling Roll-Up Door Mfg. Corp., Akron, N.Y.

[21] Appl. No.: 828,029

[22] Filed: Jan. 30, 1992

[51] Int. Cl.$^5$ .................................................. F16F 1/10
[52] U.S. Cl. .................................... 267/155; 267/168; 16/198
[58] Field of Search ............... 267/155, 168; 160/190, 160/191; 16/198, 85; 49/197, 200

[56] References Cited

U.S. PATENT DOCUMENTS

| | | | |
|---|---|---|---|
| 2,660,753 | 12/1953 | Moler | 16/198 |
| 2,749,570 | 6/1956 | Alder | 267/155 X |
| 2,786,712 | 3/1957 | Whiting | 16/198 |

Primary Examiner—Robert J. Oberleitner
Assistant Examiner—Lee W. Young
Attorney, Agent, or Firm—Sommer, Oliverio & Sommer

[57] ABSTRACT

An improved spring balancer (10) includes a shaft (13) rotatably mounted on a support (11). A first torsional spring (14) acts between the support and the shaft. A second torsional spring (19) acts between the support and a cable drum assembly (63) journalled on the shaft. A third spring (23) acts between the support and another cable drum assembly (26). A fourth cable drum (28) is fixed to the shaft. Four cables (141,142,143,144) are associated with the various cable drums (140,63,26,28) and are connected to a roll-up door (12). When the door is lowered, the various springs will absorb energy. When the door is raised, the various springs will give up energy.

14 Claims, 4 Drawing Sheets

SPRING BALANCER FOR A ROLL-UP DOOR

TECHNICAL FIELD

This invention relates generally to the field of upwardly-acting or roll-up doors, and, more particularly, to an improved spring balancer acting between a support and the door for substantially counterbalancing the weight of the door such that an operator need only supply or remove a relatively small increment of additional energy (i.e., either positive or negative) to raise or lower the door.

BACKGROUND ART

Roll-up doors are commonly found on various static structures, such as garages and industrial buildings, and on cargo-carrying truck and trailer bodies.

Such doors typically include a plurality (i.e., two or more) of series-connected horizontally-elongated rectangular panels mounted on rollers for guided upward and downward articulated movement along a pair of horizontally-spaced inverted L-shaped tracks on either side of an access opening. The door is arranged to be selectively moved between a lowered position, in which such panels are vertically arranged to close the access opening, and a raised out-of-the-way position, in which such panels are disposed horizontally overhead to permit ingress and egress through the opening.

The weight of the door is, of course, related to the number, size and particular construction of the panels. Some panels are simply formed of wood. Other panels are formed as a tubular metal extrusion, and may be filled with some other material. For example, if used to close the access opening of a refrigerated trailer, such panels may be filled with foam to provide a thermally-insulated door. Still other doors have a metal skin secured to a plywood core.

In any event, it is common to use a spring balancer between the door and the support on which it is mounted. Such balancer generally acts as a counterbalance to prevent a person from having to lift the entire weight of the door, and from having to slow its descent. To this end, it is known to employ one or more torsional springs acting between an the door and the support. Typically, each spring surrounds a portion of a shaft which is journalled on the support. Two cables are connected to the door and are arranged to be wound about two drums mounted fast to the shaft when the door is raised. These drums and cables are generally arranged to support about one-half of the nominal load, which is a function of the weight of the door. This load may, for example, be about thirty pounds [13.6 kg] less than the weight of the door itself. Hence, when the door is raised or lowered, an operator need only supply sufficient additional incremental energy which, when coupled with the energy given up or absorbed by the spring, will overcome the weight of the door. In other arrangements, the spring may be wound more tightly so that the door will lift automatically, when released, without the operator having to supply any additional energy. Indeed, if desired, the spring may be wound even more tightly so that the operator must supply negative energy (i.e., opposing the lifting force of the unwinding spring) to prevent the door from lifting too quickly. In any event, in a conventional "two-spring two-cable" spring balancer, each spring and each cable typically supports about one-half of the load. Hence, if one spring or one cable breaks, its surviving mate may not possess sufficient energy to hold the partially-opened door, particularly if it is not fully overhead. This may possibly cause a significant safety hazard to persons working beneath the door, such as persons loading or unloading a truck or trailer.

Accordingly, there is believed to be a need for an improved spring balancer, which is particularly suited for, but not limited to, use with a roll-up door, and which affords an additional measure of safety in the event that a spring or cable should break.

DISCLOSURE OF THE INVENTION

With parenthetical reference to the corresponding parts, portions or surfaces of the disclosed embodiment, for purposes of illustration, this invention provides an improved spring balancer (e.g., 10) which is mounted on a support (e.g., 11) for use in connection with an object, such as a roll-up door (e.g., 12), that is to be selectively raised and lowered relative to the support.

The improved balancer broadly includes: a shaft (e.g., 13) mounted on the support for rotation relative thereto about an axis (e.g., x—x); a first spring (e.g., 14) surrounding the shaft, the first spring having one end (e.g., 16) and having another end (e.g., 15); first means (e.g., 18) connecting the first spring other end to the object such that the first spring will absorb energy when the object is lowered and will give up energy when the object is raised; a second spring (e.g., 19) surrounding the first spring, the second spring having one end (e.g., 21) and having another end (e.g., 20); and second means (e.g., 22) journalled on the shaft for rotation relative thereto and connecting the second spring other end portion to the object such that the second spring will absorb energy when the object is lowered and will give up energy when the object is raised; whereby both of said springs will absorb energy when the object is lowered and will give up energy when the object is raised.

The improved balancer preferably includes a third spring (e.g., 23) having one end (e.g., 24) and having another end (e.g., 25), and third means (e.g., 26) connecting the third spring other end to the object such that the third spring will absorb energy when the object is lowered and will give up energy when the object is raised. Moreover, the improved balancer preferably further includes fourth means (e.g., 28) connecting the object to the other end of the first spring. The first illustrated form is of a "three-spring four-cable" arrangement in which each spring nominally supports about one-third of the load, and each cable nominally supports about one-fourth of the load, all with the object of preventing the door from unintentionally moving toward its lowered position in the event that a spring or a cable should break. The second illustrated form is of a "four-spring four-cable" arrangement in which each cable and spring nominally supports about one-fourth of the load.

Accordingly, the general object of the invention is to provide an improved spring balancer for an object, such as a roll-up door.

Another object is to provide an improved spring balancer for a roll-up door, which balancer affords an additional measure of safety in the event of individual spring or cable breakage.

Still another object is to provide an improved spring balancer for a roll-up door, which balancer is compact and which may be easily retrofitted to existing doors.

These and other objects and advantages will become apparent from the foregoing and ongoing written specification, the drawings, and the appended claims.

MODE(S) OF CARRYING OUT THE INVENTION

At the outset, it should be clearly understood that like reference numerals are intended to identify the same parts, portions or surfaces consistently throughout the several drawing figures, as such parts, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" simply refer to the orientation of a surface relative to its axis of elongation, or axis of rotation, as appropriate.

Two preferred embodiments, and various modifications, of the improved balancer are described herein. For the convenience of the reader, these will be discussed seriatim herebelow.

"THREE-SPRING FOUR-CABLE" EMBODIMENT (FIGS. 1-7)

Figure 1:
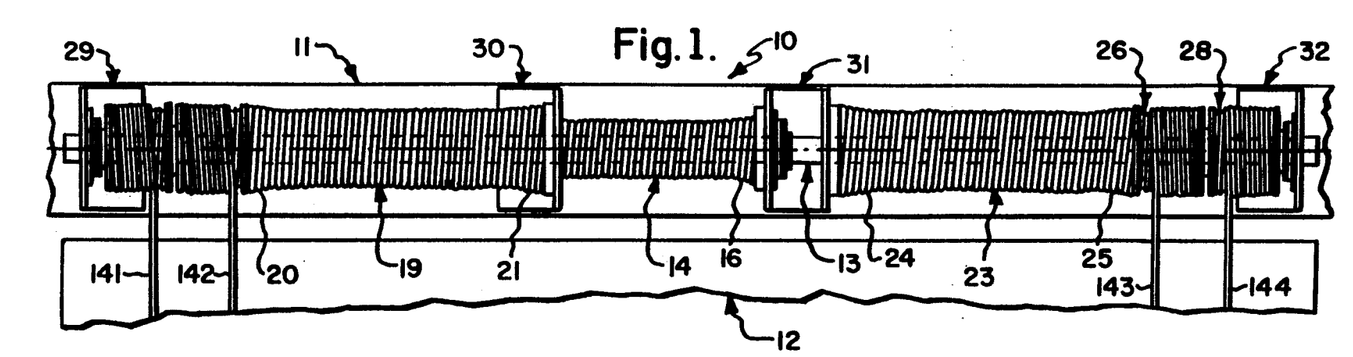
FIG. 1 is a fragmentary front elevation showing a "three-spring four-cable" embodiment of the improved balancer in association with a roll-up door.
Figure 2:
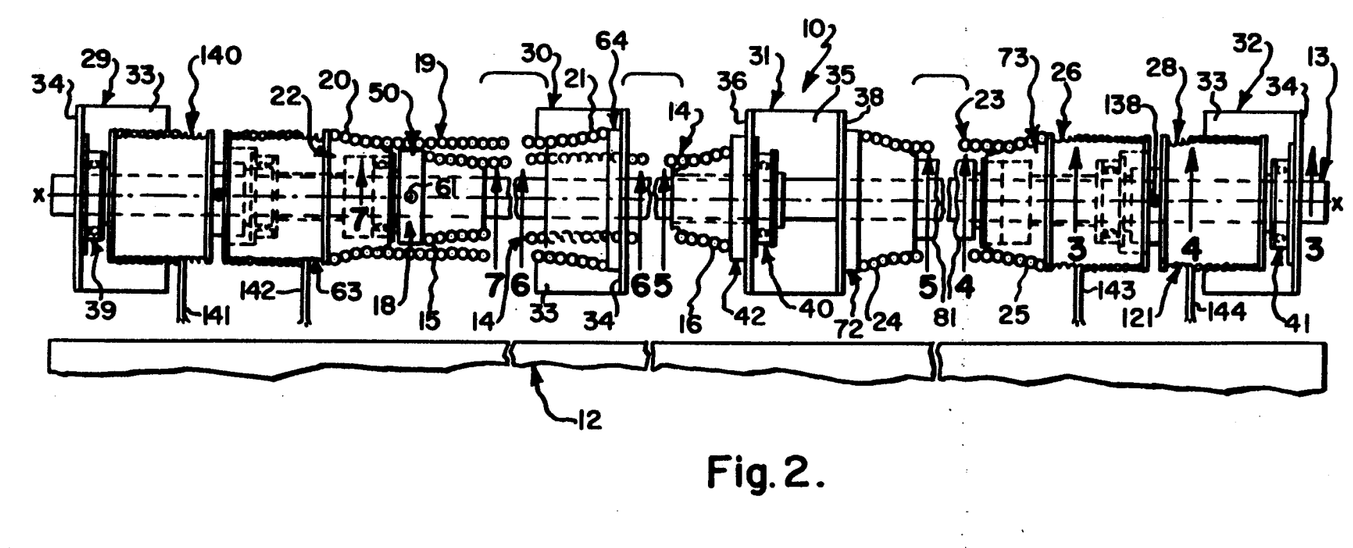
FIG. 2 is an enlarged view of the balancer show in FIG. 1, partly in vertical cross-section and partly in elevation, with portions of the cables and springs removed in order to illustrate details of the structure therebeneath.

Referring now to the drawings, and, more particularly, to FIGS. 1 and 2 thereof, this invention provides an improved spring balancer, of which the presently preferred embodiment is generally indicated at 10, which is adapted to be mounted on a suitable support, generally indicated at 11 in FIG. 1, for use with an object, such as a roll-up door, of which a fragmentary portion of the uppermost of a plurality of panels is generally indicated at 12. In FIG. 1, the support 11 is shown as being a portion of the frame of a vehicular cargo-carrying compartment (not shown), and is positioned overhead the access opening (not shown) which is arranged to be selectively closed by the door. As mentioned supra, such roll-up doors are commonly found on static structures, and on the cargo-carrying compartments of trucks and trailers. In any event, the invention will now be described with reference to a truck- or trailer-mounted roll-up door. However, it should be clearly understood that this embodiment is merely for purposes of illustration, and does not manifest an intention to exclude the use of such a spring balancer on a static structure, or with objects other than roll-up doors.

As best shown in FIGS. 1 and 2, the improved balancer 10 broadly includes a shaft 13 mounted for rotation relative to the support about horizontal axis x-x; a first torsional spring, generally indicated at 14, surrounding the shaft, the first spring having a leftward marginal end portion 15 and a rightward marginal end portion 16; first means, generally indicated at 18, operatively connecting the first spring left marginal end 15 to the shaft and door such that first spring 14 will absorb energy (i.e., will wind) when the door is lowered and will give up (i.e., will unwind) energy when the door is raised; a second torsional spring, generally indicated at 19, surrounding the shaft and the first spring, the second spring having a leftward marginal end portion 20 and a rightward marginal portion 21; and second means, generally indicated at 22, journalled on the shaft for rotation relative thereto and operatively connecting the second spring left end portion 20 to the door such that the second spring will also absorb energy (i.e., will wind) when the door is lowered and will give up energy (i.e., will unwind) when the door is raised.

The preferred embodiment is shown as further including a third torsional spring, generally indicated at 23, having a leftward marginal end portion 24 and a rightward marginal end portion 25; third means, generally indicated at 26, journalled on the shaft for rotation relative thereto and operatively connecting the third spring to the door such that the third spring will absorb energy (i.e., will wind) when the object is lowered and will give up energy (i.e., will unwind) when the object is raised. The illustrated form of the improved balancer is shown as further including fourth means, generally indicated at 28, connecting the first spring left marginal end portion 15 to the door such that the first spring 14 will absorb energy (i.e., will wind) when the door is lowered and will give up energy (i.e., will unwind) when the object is raised.

The improved balancer is shown as including four horizontally-spaced brackets 29,30,31,32, respectively, which are operatively arranged between support 11 and shaft 13. As best shown in FIGS. 1 and 2, leftwardmost bracket 29 is an integrally-formed vertically-elongated member having an L-shaped transverse cross-section (not shown). Bracket 29 has a rectangular vertical rearward plate portion 33 suitably secured to the support, as by several fasteners (not shown). A rectangular vertical flange portion 34 of bracket 29 extends normally outwardly (i.e., forwardly) from the left margin of plate portion 33.

Figure 6:
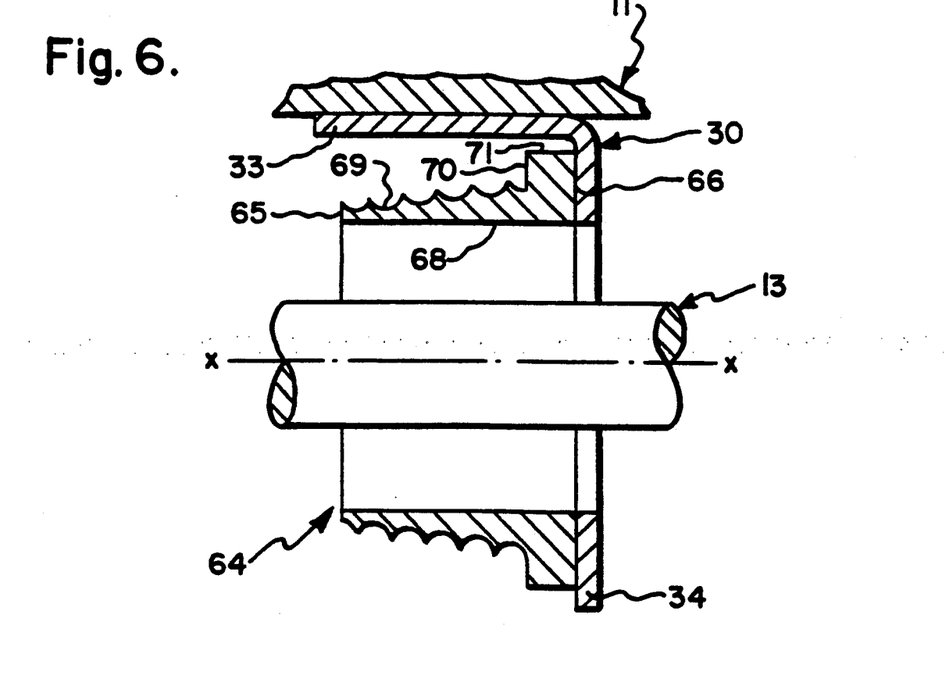
FIG. 6 is a fragmentary enlarged horizontal sectional view, taken generally on line 6—6 of FIG. 2, of the other intermediate support and the stationary spring anchor associated therewith.

As shown in FIGS. 1, 2 and 6, next-rightward bracket 30 is depicted as also being an integrally-formed vertically-elongated member having an L-shaped transverse cross-section (FIG. 6), albeit arranged as a mirror image of bracket 29. Bracket 30 similarly includes a rearward plate portion, again indicated at 33, suitably secured to the support, and has a rectangular vertical flange portion, again indicated at 34, extending normally outwardly (i.e., forwardly) from the right margin of rear plate 33.

Figure 5:
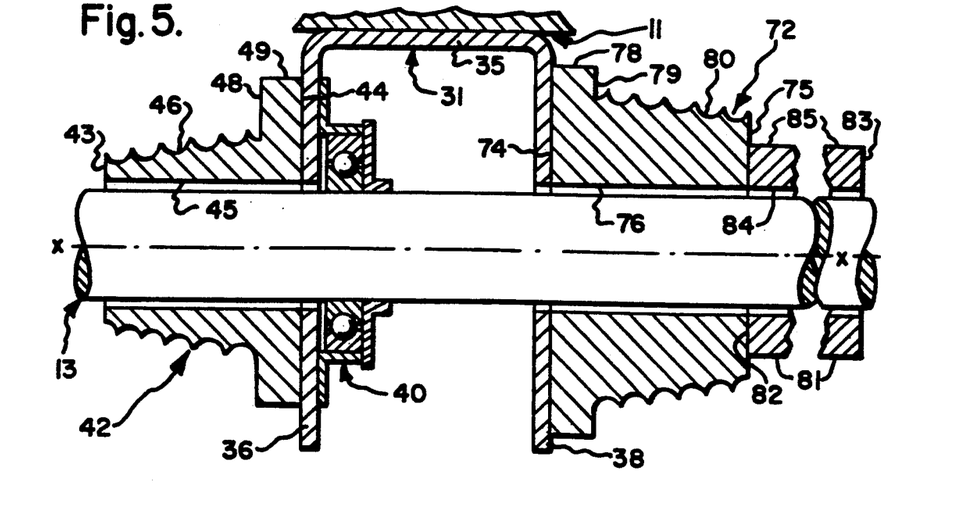
FIG. 5 is a fragmentary enlarged horizontal sectional view, taken generally on line 5—5 of FIG. 2, of one of the intermediate supports and the two stationary spring anchors associated therewith.

Referring now to FIGS. 1, 2 and 5, next-rightward bracket 31 is a vertically-elongated member having a channel- or U-shaped transverse cross-section, and has a central plate-like rearward web portion 35 suitably secured to the support, and has two horizontally-spaced flange portions 36,38 extending normally outwardly (i.e., forwardly) from the left and right margins thereof.

The rightwardmost bracket 32 is another vertically-elongated L-shaped member having a rearward rectangular plate-like portion, again indicated at 33, suitably secured to the support, and has a flange portion, again indicated at 34, extending normally away from the right margin thereof. Bracket 32 is arranged substantially as a mirror image of bracket 29. The flange portions of the various brackets are provided with aligned horizontal through-holes (not shown in FIGS. 1 and 2) to accommodate passage of shaft 13 therethrough.

Shaft 13 is shown as being a horizontally-elongated cylindrical or rod-like member penetrating the holes through the various bracket flanges, and is suitably journalled on brackets 29,31,32. More particularly, shaft 13 is journalled in a left bearing assembly 39 mounted on the flange portion 34 of left bracket 29, on an intermediate bearing assembly 40 mounted on left flange 36 of intermediate bracket member 31, and on a right bearing assembly 41 mounted on flange 34 of right bracket 32. Thus, by virtue of bearing assemblies 39,40,41, the shaft 13 is mounted for rotation about horizontal axis x-x relative to the brackets and support.

Still referring to FIG. 2, the first spring right marginal end portion 16 is shown as being fixed to a non-rotational anchor 42 secured to intermediate bracket 31. As best shown in FIG. 5, anchor 42 is a horizontally-elongated specially-configured tubular member having an annular vertical left end face 43; an annular vertical right end face 44 engaging the leftwardly-facing planar vertical surface of bracket left flange 36; an axial through-bore bounded by inwardly-facing horizontal cylindrical surface 45; and an outer surface sequentially including an outwardly- and leftwardly-facing tapered helically-convoluted surface 46 extending rightwardly from the outer margin of left end face 43, a leftwardly-facing annular vertical surface 48, and a horizontal cylindrical surface 49 continuing rightwardly therefrom to join the outer margin of right end face 44. Anchor 42 is suitably fixed, as by suitable weldments (not shown) or fasteners (not shown), to the left flange 36 of bracket 31, and is non-contactingly penetrated by an intermediate portion of shaft 13.

Figure 7:
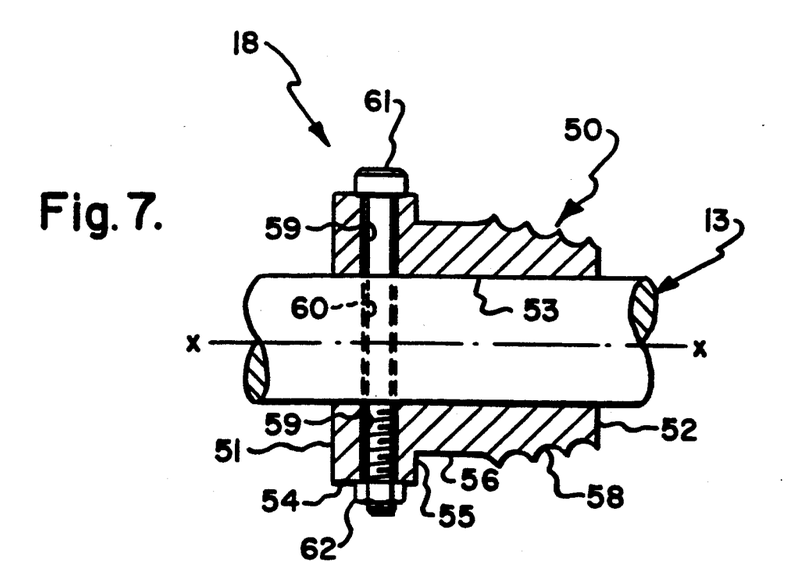
FIG. 7 is a fragmentary enlarged horizontal sectional view, taken generally on line 7—7 of FIG. 2, of the shaft spring anchor.

The first spring left marginal end portion 15 is suitably connected to an anchor 50 mounted fast to shaft 13. As best shown in FIG. 7, anchor 50 is a horizontally-elongated specially-configure tubular member having an annular vertical left end face 51; an annular vertical right end face 52; an axial through-bore bounded by an inwardly-facing horizontal cylindrical surface 53; and an outer surface which sequentially includes a horizontal cylindrical surface 54 extending rightwardly from the outer margin of left end face 51, a rightwardly-facing annular vertical surface 55, a horizontal cylindrical surface 56, and a rightwardly- and outwardly-facing tapered helically-convoluted surface 58 continuing rightwardly therefrom to join the outer margin of right end face 52. A diametrical through-hole, portions of which are indicated at 59, is provided through anchor 50 from its outer surface 54. This hole is adapted to be aligned with a diametrical hole 60 provided through the shaft, to accommodate passage of the shank portion of a bolt-like fastener 61 therethrough. Nut 62 is shown as being threaded onto the lower marginal end portion of bolt 61 to prevent unintended separation of this fastener from the cable drum-shaft assembly. Thus, anchor 50 is mounted fast to the shaft for rotation therewith. First spring 14 is a torsional spring having its left marginal end portion 15 suitably secured to shaft anchor 50, and having its right marginal end portion 16 suitably secured to stationary anchor 42.

Second torsional spring 19 has its left marginal end portion 20 operatively coupled to a cable drum assembly 63 journalled on the shaft. This cable drum is substantially identical to a similar cable drum of the third means 26, described infra. Hence, a detailed description of cable drum 63 will be omitted, it being understood that this is a mirror image of the cable drum of the third means. The various convolutions of the second spring left marginal end portion 20 are received in the complimentary convolutions of cable drum 63, and the various convolutions of its rightward marginal end portion 21 are received in the various convolutions of stationary anchor 64 mounted fast to the flange of bracket 30.

As best shown in FIG. 6, anchor 64 is generally similar to anchor 42, except that anchor 64 is of variant dimensions. More particularly, anchor 64 is depicted as being a horizontally-elongated specially-configured tubular member having an annular vertical left end face 65; an annular vertical right end face 66; an axial through-bore bounded by inwardly-facing horizontal cylindrical surface 68; and an outer surface which sequentially includes a leftwardly- and outwardly-facing tapered helically-convoluted surface 69 extending rightwardly from the outer margin of left end face 65, a leftwardly-facing annular vertical surface 70, and a horizontal cylindrical surface 71 continuing rightwardly therefrom to join the outer margin of right end face 66. Anchor 64 is mounted fast, as by a weldment (not shown) or fasteners (not shown), to the leftwardly-facing surface of flange 34 of intermediate bracket 30, and is non-contactingly penetrated by shaft 13.

Figure 4:
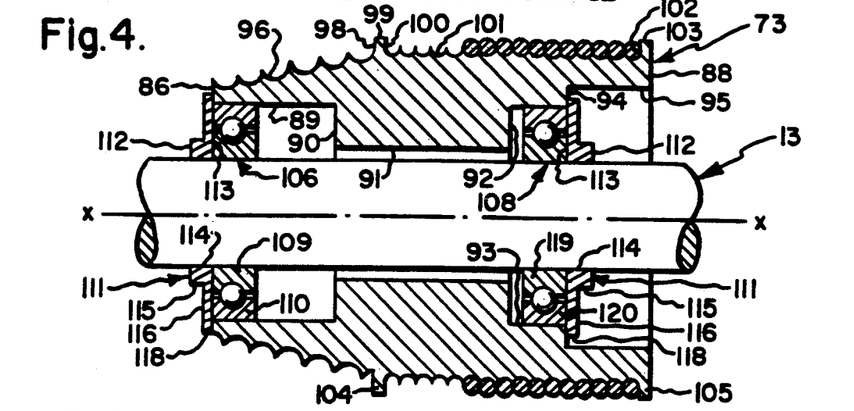
FIG. 4 is a fragmentary enlarged horizontal sectional view, taken generally on line 4—4 of FIG. 2, of the next-leftward cable drum.

Adverting now to FIG. 2, the preferred embodiment is shown as including a third torsional spring 23 having its left marginal end portion 24 connected to anchor 72 mounted fast to right flange 38 of intermediate bracket 31, and as having its right marginal end portion 25 mounted fast to a drum assembly, generally indicated at 73, journalled on the shaft (FIG. 4). As best shown in FIG. 5, third spring anchor 72 is shown as being a horizontally-elongated specially-configured tubular member having an annular vertical left end face 74 suitably secured to the right face of bracket flange 38 as by weldments (not shown) or fasteners (not shown); having an annular vertical right end face 75; having an axial through-bore bounded by inwardly-facing horizontal cylindrical surface 76; and having an outer surface which sequentially includes a horizontal cylindrical surface 78 extending rightwardly from the outer margin of left end face 74, a rightwardly-facing annular vertical surface 79, and a rightwardly-and outwardly-facing tapered helically-convoluted surface 80 continuing rightwardly therefrom to join the outer margin of right end face 75. Surface 80 is adapted to receive the convolutions of the third spring left marginal end portion 24. A horizontally-elongated coaxial tubular collar 81 is shown as surrounding the shaft to the immediate right of anchor 72. This collar is shown as having an annular vertical left end face 82 arranged to abut anchor right end face 75, an annular vertical right end face 83, and horizontal inner and outer cylindrical surfaces 84,85, respectively. Thus, anchor 72 and collar 81 are non-contactingly penetrated by shaft 13. Collar 81 may be mounted on anchor 72 by suitable weldment (not shown) or suitable fasteners (not shown), and functions to hold cable drum 73 away from bracket 31. Alternatively, collar 81 may be mounted on the shaft for movement therewith, with its left end face arranged to slidably engage anchor right end face 75.

Referring now to FIG. 4, drum assembly 73 is shown as being a horizontally-elongated specially-configured coaxial tubular member having an annular vertical left end face 86; an annular vertical right end face 88; and a stepped axial through-bore sequentially bounded by a horizontal cylindrical surface 89 extending rightwardly from the inner margin of left end face 86, a leftwardly-facing annular vertical surface 90, a horizontal cylindrical surface 91, a rightwardly-facing annular vertical surface 92, a horizontal cylindrical surface 93, a rightwardly-facing annular vertical surface 94, and a horizontal cylindrical surface 95 continuing rightwardly therefrom to join the inner margin of right end face 88. The outer surface of cable drum 73 sequentially includes: a leftwardly- and outwardly-facing tapered helically-convoluted surface 96 extending rightwardly from the outer margin of left end face 86 and adapted to receive the third spring right marginal end 25, a leftwardly-facing annular vertical surface 98, a horizontal cylindrical surface 99, a rightwardly-facing annular vertical surface 100, an outwardly-facing helically-convoluted surface 101, a leftwardly-facing annular vertical surface 102, and a horizontal cylindrical surface 103 continuing rightwardly therefrom to join the outer margin of right end face 88. Surfaces 98-100 define an outwardly-extending annular flange 104 separating the right margin of surface 96 from the left margin of surface 100. Surfaces 102,103,88 define another outwardly-extending annular flange 105 adjacent the right marginal end of surface 101. Flanges 104,105 serve to retain the convolutions of the associated cable on surface 101.

As best shown in FIG. 4, cable drum 73 is journalled on an intermediate portion of shaft 13 by a pair of horizontally-spaced roller bearing assemblies 106,108. Left bearing assembly 106 has its inner race 109 mounted for movement with the shaft, and has its outer race 110 engaging the left marginal end portion of surface 89. The left bearing assembly is held on this operative position by an annular retainer generally indicated at 111, also generated about axis x-x. Retainer 111 is shown as having an annular vertical left end face 112; an annular vertical right end face 113; an axial through-bore bounded by inwardly-facing horizontal cylindrical surface 114; and a stepped outer surface which sequentially includes a horizontal cylindrical surface 115 extending rightwardly from the outer margin of left end face 112, a leftwardly-facing annular vertical surface 116, and a horizontal cylindrical surface 118 continuing rightwardly therefrom to rejoin the outer margin of right end face 113. The right end face 113 of retainer 111 is shown as being engaged with the left face of bearing assembly 106, and a portion of cable drum left end face 86. Collar right end face 83 is adapted to be received in the annular notch defined by retainer surfaces 115,116, and functions to hold left bearing assembly 106 in the operative position shown.

Right bearing assembly 108 has its inner race 119 mounted on the shaft, and has its outer race 120 engaging cable drum surface 93. The right bearing assembly is held in this position by another retainer, again indicated at 111, which is structurally identical to, but arranged as a mirror image of, left retainer 111. Since the left retainer has been previously discussed, a detailed description of the right retainer will be omitted, it being understood that the same reference numerals have been used to refer to the corresponding surfaces of the right retainer.

Figure 3:
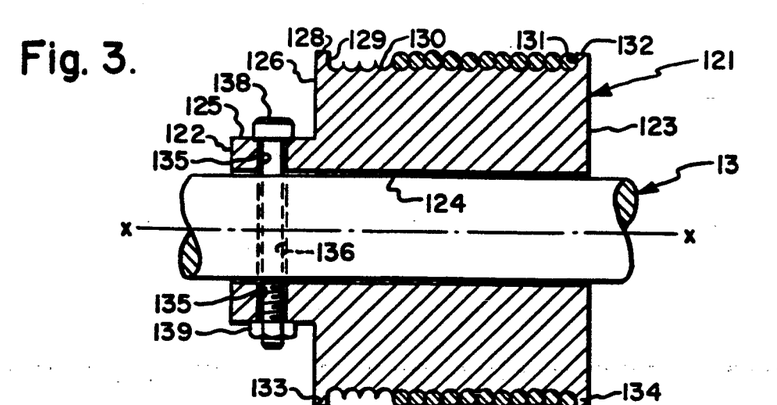
FIG. 3 is a fragmentary enlarged horizontal sectional view, taken generally on line 3—3 of FIG. 2, of the rightwardmost cable drum.

Referring now to FIGS. 1-3, the fourth means 28 is shown as including a horizontally-elongated specially-configured cable drum, generally indicated at 121, mounted fast to the right marginal end portion of shaft 13. More particularly, drum 121 is depicted as having an annular vertical left end face 122; an annular vertical right end face 123; an axial through-bore bounded by inwardly-facing horizontal cylindrical surface 124; and a stepped outer surface which sequentially includes a horizontal cylindrical surface 125 extending rightwardly from the outer margin of left end face 122, a leftwardly-facing annular vertical surface 126, a horizontal cylindrical surface 128, a rightwardly-facing annular vertical surface 129, an outwardly-facing helically-convoluted surface 130, a leftwardly-facing annular vertical surface 131, and a horizontal cylindrical surface 132 continuing rightwardly therefrom to join the outer margin of right end face 123. Surfaces 126,128,129 and 131,132,123 define a pair of left and right outwardly-extending annular flanges 133,134, respectively, which function to retain the associated cable on surface 130. A diametrical hole, portions of which are indicated at 135, is provided through drum 121 from surface 125 thereof. Hole 135 is adapted to be aligned with a hole 136 provided through the shaft to accommodate the shank portion of bolt-like fastener 138. A nut 139 is threaded onto the lower marginal end portion of fastener 138 to prevent unintended separation of the fastener from the operative engagement with the drum and shaft, as shown in FIG. 3. Thus, cable drum 121 is mounted fast to the shaft for rotation therewith.

Adverting now to FIGS. 1 and 2, the improved balancer is shown as also having another cable drum, generally indicated at 140, mounted on the left marginal end portion of shaft 13. Inasmuch as the left cable drum is identical to, but arranged as a mirror image of, the right cable drum 121, just discussed, a detailed discussion of left drum 140 will be omitted in the interest of brevity.

Therefore, the first form of the improved balancer includes first means 18 connecting first spring left marginal end portion 15 to the door. The first means includes anchor 50 mounted fast to the shaft, left cable drum 140, and a cable 141 having its lower marginal end portion secured to the door, by its upper end (not shown) suitably fixed to the drum 140, and having its intermediate convolutions received in the left cabled drum convoluted surface 101. The improved balancer also includes second means 22 connecting second spring left marginal portion to the door. The second means includes left drum assembly 63 secured to the second spring left marginal end 20 and journalled as the shaft, and a cable 142 having its lower marginal end portion secured to the door, having its upper marginal end (not shown) suitably fixed to drum 63, and having its intermediate convolutions received in the left drum convoluted surface 101. The preferred form of the improved balancer also includes third means 26 connecting the third spring right marginal end portion 25 to the door. The third means includes cable drum 73 attached to the right marginal end portion of the third spring, and journalled on the shaft, and a cable 143 having its lower marginal end portion secured to the door, having its upper end secured to drum 73, and having its intermediate convolutions received in right drum convolutions 101. The preferred form of the improved balancer is shown as further including fourth means 28 connecting the first spring left marginal end portion 15 with the door. The fourth means includes cable drum 121 mounted fast to the right marginal end of shaft 13, and a cable 144 having its lower end secured to the door, having its upper end secured to drum 121, and having its intermediate convolutions arranged in convolutions 130. Therefore, the first, second, third and fourth means are operatively associated with the first, second, third and fourth springs, respectively, such that each of three springs will absorb energy when the door is lowered and will give up energy with the door is raised.

The embodiment shown therefore has three springs and four cables. If the balancer is used to support a load (e.g., thirty pounds less than the weight of the door), should any spring break while the door is in a half-way up position, the other two springs will initially continue to support about two-thirds of the load. While the door may indeed descend, its downward velocity will be at least slowed until the other unaffected springs absorb sufficient additional energy to support the entire load. On the other hand, each of in-board cables 142 and 143 are adapted to support about one-third of the load, and outboard cables 141,144 are angled to severally support about one-sixth of the load. Thus, should either in-board cable break, the remaining cables will continue to support about two-thirds of the load. On the other hand, should either outboard cable break, the weight usually carried by the broken cable will be immediately transferred to the other outboard cable, and the total load supported by the improved balancer will be unaffected by the broken outboard spring.

Figure 8:
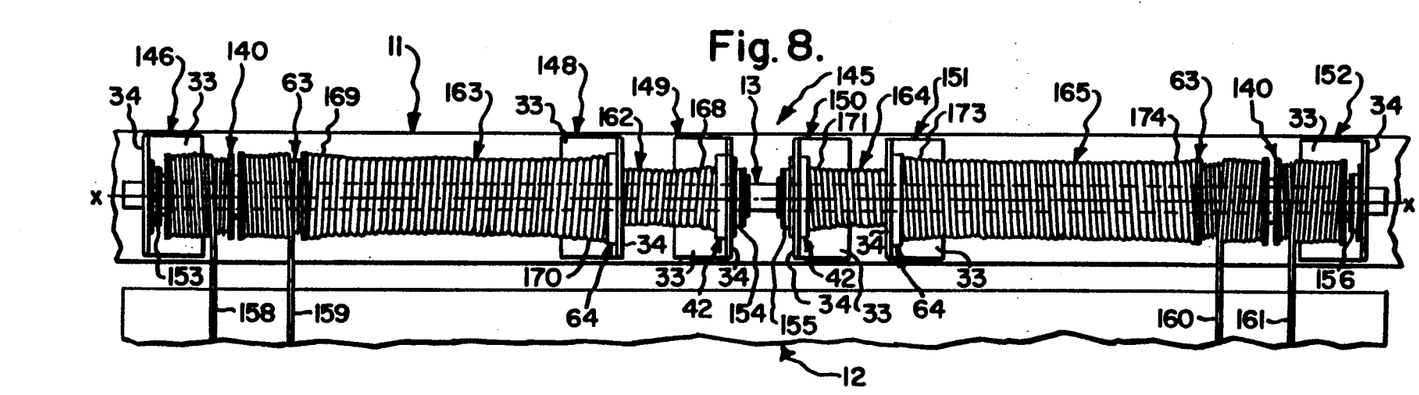
FIG. 8 is a fragmentary front elevation showing a "four-spring four-cable" embodiment of the improved balancer in association with a roll-up door.
Figure 9:
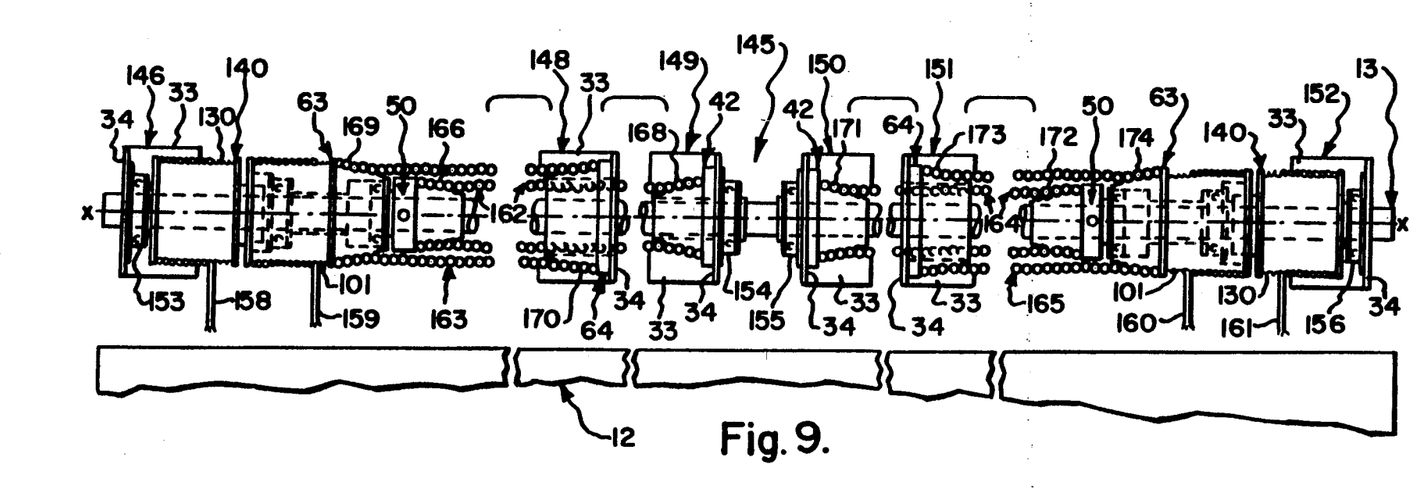
FIG. 9 is an enlarged view of the balancer shown in FIG. 8, partly in vertical cross-section and partly in elevation, with portions of the cables and springs removed in order to illustrate details of the structure therebeneath.

"FOUR-SPRING FOUR-CABLE" EMBODIMENT (FIGS. 8-9)

Referring now to FIGS. 8 and 9, a second form of the improved balancer, generally indicated at 145, is shown as being mounted on a fragmentary portion of a support 11, and as being operatively associated with an object, such as a roll-up door 12. Whereas the first form shown in FIGS. 1-7 is a "three-spring four-cable" embodiment, the second form shown in FIGS. 8-9 is a "four-spring four-cable" embodiment. Much of the structure of the balancer second form 145 has been previously described. Hence, the detailed description of the second form will be somewhat abbreviated, and being understood that the same reference numerals refer to the previously-described structure.

Thus, second form 145 is shown as having a horizontally-elongated shaft, again indicated generally at 13, operatively mounted on the support by six horizontally-spaced brackets, severally indicated at 146,148,149,150,151,152, respectively. Each of these brackets is an integrally-formed vertically-elongated member having a generally L-shaped horizontal transverse cross-section. Thus, each bracket has a rectangular vertical rear plate portion, again indicated at 33, suitably secured to the support, as by a plurality of fasteners (not shown), and has a rectangular vertical flange portion, again indicated at 34, extending horizontally outwardly (i.e., forwardly) from one lateral margin of the rear plate-like portion. Each flange portion has a horizontal hole therethrough to accommodate a portion of shaft 13. The shaft is journalled on four bearing assemblies 153,154,155,156 mounted on the flange portions of brackets 146,149,150,152, respectively. Thus, shaft 13 is mounted for rotational movement relative to the brackets and support about horizontal axis x—x.

As best shown in FIG. 9, a number of elements are mounted on the shaft or brackets. Proceeding from left-to-right in FIG. 9, a left cable drum, again indicated at 140 is mounted fast to the shaft for movement therewith. To the immediate right of drum 140, a cable drum assembly, again indicated at 63, is journalled on the shaft for rotation relative thereto. A spring anchor, again indicated at 50, is mounted fast to the shaft to the immediate right of cable drum assembly 63. Bracket 148 is shown as having an anchor, again indicated at 64, mounted thereon. Bracket 149 has another anchor, again indicated at 42 mounted thereon.

The remaining structure of this "four-spring four-cable" embodiment is a mirror image of the structure just described. In other words, the structure to the right of the axial midpoint of shaft 13 is simply a mirror image of the structure just described to the left thereof. Thus, the same reference numerals have been used to identify the corresponding structure to the right of the shaft midpoint. A leftward cable 158 has its lower marginal end portion secured to the door, has its upper marginal end portion secured to left cable drum 140, and has its intermediate convolutions received in helical convolutions 130. A second cable 159 has its lower marginal end portion secured to the door, has its upper marginal end secured to cable drum assembly 63, and has its intermediate convolutions received in helically-convoluted surface 101. A third cable 160 is shown as having its lower marginal end portion secured to the door, having its upper marginal end portion secured to right cable drum assembly 63, and having its various convolutions received in cable drum helically-convoluted surface 101. Finally, a fourth cable 161 has its lower marginal end portion secured to the door, has its upper marginal end portion secured to right cable drum 140, and has its intermediate convolutions received in right cable drum helically-convoluted surface 130.

The embodiment shown in FIGS. 8 and 9 is depicted as having four torsional springs, indicated at 162,163,164,165, respectively. Each of these springs resembles a coil spring, but is mounted for torsional loading and unloading. First spring 162 is shown as having its left marginal end portion 166 suitably secured to left shaft anchor 50, and as having its right marginal end portion 168 suitably secured to left stationary anchor 42. Second spring 163 is shown as having its left marginal end portion 169 suitably secured to left cable drum assembly 73, and as having its right marginal end portion 170 secured to support anchor 64. Third spring 164 has its left marginal end portion 171 secured to right support anchor 42, and has its right marginal end portion 172 secured to right shaft anchor 50. Fourth spring 165 has its left marginal end portion 173 secured to right anchor 64, and has its right marginal end portion 174 secured to right cable drum assembly 63. Thus, each of the cables is operatively associated with at least one of the springs such that the springs will absorb energy (i.e., will wind up) when the door is lowered, and will give up energy (i.e., will unwind) when the door is raised.

In this embodiment, each of the cables nominally supports about one-fourth of the load of the door. Springs 162,164 act between the support (via the intermediate brackets) and the shaft. Springs 163,165 act between the support (via the associated bracket) and the left and right cable drum assembly 73,73, respectively. In this form, each of the springs nominally supports about one-fourth of the load. Hence, should any spring break, only one-fourth of the load-supporting capacity will be lost. Similarly, outboard cables 158,161 are mounted on left and right cable drums 140,140, which are connected to the shaft. Hence, should either outboard cable break, the load normally carried thereby will be immediately borne by its unbroken mate.

MODIFICATIONS

The present invention acknowledges many changes and modifications may be made. For example, while a "four-cable three-spring" and a "four-cable four-spring" embodiments have been shown and described, persons skilled in this art will readily appreciate that various additional changes and modifications may be made. For example, the particular manner by which the various springs may be anchored to the support or other structure, may readily be changed. For example, anchors 42,72 could be mounted on a single flange of a bracket, if desired. Similarly, other types of bearings might be alternatively employed. Similarly, the specific structure of the various cable drums and cable drum assemblies, and shaft anchors, may be readily changed or modified to suit a particular design configuration. Similarly, in some cases, the shaft may be discontinuous in length.

Therefore, while two presently-preferred embodiments of the improved spring balancer have been shown and described, and several modifications thereof discussed, persons skilled in this art will readily appreciate that various additional changes and modifications may be made, without departing from the spirit of the invention, as defined and differentiated by the following claims.

I claim:

1. A spring balancer mounted on a support for use with an object arranged to be selectively raised and lowered relative thereto, comprising:
   a shaft mounted on said support for rotation relative thereto about an axis;
   a first spring surrounding said shaft, said first spring having one end fixed to said support and having another end;
   first means operatively connecting said first spring other end to said object such that said first spring will absorb energy when said object is lowered and will give up energy when said object is raised;
   a second spring surrounding said shaft, said second spring having one end fixed to said support and having another end;
   second means journalled on said shaft for rotation relative thereto and operatively connecting said second spring other end to said object such that such second spring will absorb energy when said object is lowered and will give up energy when said object is raised
   a third spring surrounding said shaft, said third spring having one end and having another end; and
   third means operatively connecting said third spring other end to said object such that said third spring will give up energy when said object is raised.

2. A spring balancer as set forth in claim 1 wherein said first means includes a first drum mounted fast to said shaft for movement therewith, and a first cable connected to said object and arranged to be wound on said first drum when said object is raised.

3. A spring balancer as set forth in claim 2 wherein said second means includes a second drum journalled on said shaft for rotation relative thereto, and a second cable connected to said object and arranged to be wound on said second drum when said object is raised.

4. A spring balancer as set forth in claim 3 wherein said third spring one end is mounted fast to said support.

5. A spring balancer as set forth in claim 1 wherein said object is a roll-up door.

6. A spring balancer as set forth in claim 5 wherein said support is a portion of a cargo-carrying body.

7. A spring balancer as set forth in claim 1 wherein said third means includes a third drum journalled on said shaft for rotation relative thereto, and a third cable connecting said object to said third drum such that said third spring will give up energy when said object is raised.

8. A spring balancer as set forth in claim 7 and further comprising: fourth means connecting first spring other end to said object such that said first spring will give up energy when said object is raised.

9. A spring balancer as set forth in claim 8 wherein said fourth means includes a fourth drum mounted fast to said shaft, and a fourth cable connected to said object and arranged to be operatively wound on said fourth drum when said object is raised.

10. A spring balancer as set forth in claim 9 wherein each of said cables supports about one-fourth of a load which is a function of the weight of said object.

11. A spring balancer as set forth in claim 9 wherein each of said springs supports about one-third of a load which is a function of the weight of said object.

12. A spring balancer as set forth in claim 7 wherein each of said cables supports about one-third of a load which is a function of the weight of said object.

13. A spring balancer as set forth in claim 7 wherein each of said springs supports about one-third of a load which is a function of the weight of said object.

14. A spring balancer as set forth in claim 1 and further comprising:
   a fourth spring surrounding said shaft, said fourth spring having one end and having another end; and
   fourth means operatively connecting said fourth spring other end to said object such that said fourth spring will give up energy when said object is raised.

* * * * *